(12) United States Patent
Marchand et al.

(10) Patent No.: US 8,170,947 B2
(45) Date of Patent: *May 1, 2012

(54) FRAUD DETECTION BASED ON CALL ATTEMPT VELOCITY ON TERMINATING NUMBER

(75) Inventors: Dean C. Marchand, Brighton, CO (US); Erin C. Jackman, Denver, CO (US)

(73) Assignee: Verizon Business Global LLC, Basking Ridge, NJ (US)

( * ) Notice: Subject to any disclaimer, the term of this patent is extended or adjusted under 35 U.S.C. 154(b) by 1124 days.

This patent is subject to a terminal disclaimer.

(21) Appl. No.: 11/757,733

(22) Filed: Jun. 4, 2007

(65) Prior Publication Data

US 2007/0230675 A1    Oct. 4, 2007

Related U.S. Application Data

(62) Division of application No. 09/575,470, filed on May 22, 2000, now Pat. No. 7,236,954.

(51) Int. Cl.
*G06Q 40/00* (2006.01)

(52) U.S. Cl. .................. 705/37; 705/14.26; 455/410

(58) Field of Classification Search .............. 705/35–45, 705/14.26; 455/410
See application file for complete search history.

(56) References Cited

U.S. PATENT DOCUMENTS

| | | |
|---|---|---|
| 5,524,145 A | 6/1996 | Parker |
| 5,524,245 A | 6/1996 | Zarrin et al. |
| 5,566,234 A | 10/1996 | Reed et al. |
| 5,602,906 A | 2/1997 | Phelps |
| 5,768,354 A | 6/1998 | Lange et al. |
| 5,867,566 A | 2/1999 | Hogan et al. |
| 5,875,236 A | 2/1999 | Jankowitz et al. |
| 5,937,043 A | 8/1999 | He |
| 5,963,625 A | 10/1999 | Kawecki et al. |
| 5,970,129 A | 10/1999 | Hooshmand et al. |
| 6,195,422 B1 | 2/2001 | Jones et al. |
| 6,208,720 B1 | 3/2001 | Curtis et al. |
| 6,396,915 B1 | 5/2002 | Springer et al. |
| 6,418,212 B1 | 7/2002 | Harrison et al. |
| 6,516,056 B1 | 2/2003 | Justice et al. |

FOREIGN PATENT DOCUMENTS

| | | |
|---|---|---|
| EP | 0618713 | 10/1994 |
| EP | 0805580 | 5/1997 |

OTHER PUBLICATIONS

E. K. P. Chong and S. H. Zak, *An Introduction to Optimization*. New York, NY: John Wiley and Sons, Inc., 1996, ISBN 0-471-08949-4, xiii+409 pp.

*Primary Examiner* — Richard C Weisberger

(57) ABSTRACT

A method of identifying fraud in a telecommunications system, the method including receiving data related to a current call placed from an originating ANI to a terminating ANI, where the received data includes the terminating ANI and a billing number used to place the call. Billing numbers for prior calls to the terminating ANI, if any, and corresponding indicia of the times of the calls are retrieved. A determination is made of whether the number of billing numbers used for the current and prior calls to the terminating ANI over a prior period of time falling within a time interval satisfies a threshold. If the threshold is satisfied, a fraud alert is generated.

20 Claims, 3 Drawing Sheets

FRAUD DETECTION BASED ON CALL ATTEMPT VELOCITY ON TERMINATING NUMBER

CROSS-REFERENCE TO RELATED APPLICATIONS

The above-noted application is a divisional of U.S. patent application Ser. No. 09/575,470, filed May 22, 2000, entitled "Fraud Detection Based on Call Attempt Velocity on Terminating Number", the entirety of which is incorporated herein by reference.

BACKGROUND OF THE INVENTION

1. Technological Field

The invention relates to preventing fraudulent access to a telecommunications system. In particular, the invention relates to identifying fraudulent calls terminating at a particular telephone number (a "terminating automatic number indicator" or "terminating ANI").

2. Description of the Related Art

Fraud costs the telecommunications industry billions of dollars per year. There are many techniques used to perpetrate fraud. The fraud can be as simple as using a stolen credit card to charge a long distance call, or it can involve sophisticated looping techniques, such as repeatedly calling a private PBX system, finding the correct sequence to access an outside line (by trial and error or other hacking techniques) and then placing a costly long distance call through the PBX system. The telecommunications industry is involved in an intensive and ongoing effort to identify different types of fraud and then to develop and implement ways of preventing such fraud.

Fraud is more costly to certain telecommunications companies than others. For example, where a fraudulent call is directed at a company that owns the underlying telecommunications infrastructure, the cost of the call is less than the cost to an independent company that incurs access charges to the owner(s) of the infrastructure supporting the call, even if the call is fraudulent. In either case, however, the cost to the industry is significant.

Particular methods of fraud control and systems for implementing them are known in the industry. Fraud control may be divided conceptually into identifying a call that is likely to be fraudulent and responding after a call is identified as likely to be fraudulent. Methods of identifying calls that are likely to be fraudulent vary from the simple to the sophisticated and are generally directed at a particular type of fraudulent activity. For example, a call is likely to be fraudulent if it is made using a calling card that has been reported stolen by the owner.

A more sophisticated method and system of identifying fraudulent calls is described in U.S. Pat. No. 5,768,354, entitled "Fraud Evaluation And Reporting System and Method Thereof", which is owned by the assignee of the present invention. Fraudulent activity is identified in the '354 patent by monitoring a billing detail record created for each call. In the simple case, where the company's database shows that the billing number being used for a call has been reported lost, stolen, etc., the billing detail record includes a header designating it as a "bad billing number"; the call is then immediately identified as fraudulent and an alert is generated in the system.

The '354 patent is directed to calls that require "special service", that is, which are placed through an operator or an automatic operation support system. Such calls generally require the caller to manually supply the billing number, such as by pressing numbers on a payphone, swiping the magnetic strip on a card through a card reader or speaking with an operator. It may also require the caller to identify the category of billing product (such as credit card, calling card, or prepaid phone card) for the billing number. The category of the billing product may alternatively be identified by the system by matching all or part of the billing number with billing numbers (or ranges of billing numbers) stored in an identification database, where the stored billing numbers are correlated with the category of billing product. The identification database may also correlate a billing number with the particular type of billing product for the category. For example, where the category of the billing number is identified as a credit card, the identification database may use the billing number to further identify the type of credit card, such as Visa, Master Card, American Express, etc.

The '354 patent also identifies fraudulent activity by monitoring use of a billing number over time. For example, where the number of domestic calls placed within a certain amount of time using the same billing number exceeds a threshold, an alert is generated. International calls are similarly handled, however, the threshold may be adjusted so that fewer calls within the time period generate an alert. In addition, the threshold may be further adjusted for calls to countries where a high percentage of fraudulent calls are directed. The thresholds may also be varied by the billing product. For example, fraudulent activity may be determined to be more likely to occur on a calling card than on a third party call; consequently, the threshold may be set lower for calling card products.

Once a call initiates an alert that the call might be fraudulent, additional activity may be taken to further examine whether the billing number is being used fraudulently, or steps may be taken to prevent further calls using the billing number. In the '354 patent, after an alarm is generated, data for prior calls charged to the billing number are sent to a fraud analyst, who analyzes that data and may determine whether or not to deactivate the card. If the decision is to deactivate the card, the '354 patent describes the analyst as setting a fraud flag.

While monitoring billing numbers and blocking those numbers displaying evidence of fraudulent usage is an important component of fraud prevention, no one technique in itself is sufficient to prevent fraudulent access. Perpetrators of fraud (also referred to herein as "hackers") are persistent and creative and are constantly developing new ways of evading fraud prevention mechanisms. In addition, there is a ready (and relatively inexpensive) supply of stolen billing numbers available to those who are so disposed to obtain and use them. Thus, the fraud detection and prevention techniques that focus on repeated use of a single billing number may not be effective against hackers who have a supply of different billing numbers.

For example, a series of fraudulent calls may be made from a single originating ANI over time. One prominent example of this type of fraudulent activity is when an attempt is made to hack into a private PBX in order to access information or to use the PBX to make a subsequent call. In the latter case, the call to the PBX may be a local or domestic call, which is less likely to attract attention, whereas the subsequent call made from the PBX may be a costly international call. If such calls are made using different billing numbers, then the fraud will not be prevented based on fraud prevention techniques that rely on repeated use of a billing number.

One possible way of preventing this type of fraud would be to monitor the activity of the originating ANI. A fraud alert may be generated if a threshold number of different billing numbers are used to place calls within a certain time interval. The threshold and time interval may be set based on the type of originating ANI. For example, the number of different billing numbers used to place calls at a payphone over the course of an hour will likely be relatively high, since many different people have access to such a phone. By contrast, the number of different billing numbers for calls placed from a private cellular phone would normally be quite low. The fraud alert may be followed by blocking calls from the originating ANI, for example. Such a technique is described in U.S. Pat. No. 6,947,532, entitled "Fraud Detection Based On Call Attempt Velocity On Originating Number", and assigned to the assignee of the present application.

Under certain circumstances, however, a hacker may readily avoid the blocking of an originating ANI. For example, the hacker may have a bank of payphones available, and simply move on to the next payphone once the one he is using becomes blocked.

A hacker operating in such a manner, using different billing numbers as well as moving from one phone (originating ANI) to another is often placing calls to the same terminating ANI. The hacker will often be trying to access a private PBX, which takes repeated calls in order to achieve the hacker's goal by trial and error. (The "goal" may be determining how to access a database serving the PBX or an outside line of the PBX, so that a subsequent call may be placed through the PBX.)

Thus, it would be desirable to have a system and method for detecting and preventing fraud in a telecommunications system where repeated calls are being made to the same terminating ANI from different originating ANIs using different billing numbers.

SUMMARY OF THE INVENTION

It is an objective of the present invention to provide a method and system for detecting fraudulent calls directed at a terminating ANI. It is also an objective to detect such calls where the fraudulent calls are being made from different originating ANIs and using different billing numbers. It is also an objective of the present invention to prevent further fraudulent calls from being made to the terminating ANI.

In accordance with these objectives, one preferred embodiment of the present invention provides a method of identifying fraud in a telecommunications system. The method includes receiving data related to a current call placed from an originating ANI to a terminating ANI, where the received data includes the terminating ANI and a billing number used to place the call. Billing numbers for prior calls to the terminating ANI, if any, and corresponding indicia of the times of the calls are retrieved. A determination is made of whether the number of billing numbers used for the current and prior calls to the terminating ANI over a prior period of time falling within a time interval satisfies a threshold. If the threshold is satisfied, a fraud alert is generated.

In general, there are two ways to utilize a "threshold", namely (1) determine whether the threshold is exceeded or (2) determine whether the threshold is met or exceeded. Thus, for the purposes of this application, the term "satisfying" a threshold is defined as either of these two cases. That is, a threshold is defined as "satisfied" when it is exceeded. A threshold is alternatively defined as "satisfied" when it is met (equaled) or exceeded. Similarly, a period of time is defined as "falling within" a time interval if it is less than the time interval and a period of time is alternatively defined as "falling within" a time interval if it is less than or equal to the time interval.

When the data for the current call is received, a check may also be performed (for example, in the memory) to determine if there is a threshold number and a time interval corresponding to the particular terminating ANI. If there is, the threshold number and the time interval are retrieved and used in determining whether the number of billing numbers used for the current and prior calls to the terminating ANI over a prior period of time falling within the retrieved time interval satisfies the retrieved threshold number.

Another preferred embodiment of the invention is also a method of identifying fraud in a telecommunications system. The method includes receiving data related to a current call placed from an originating ANI to a terminating ANI, where the received data includes the terminating ANI and a billing number. The received data is stored, for example, in a memory. The billing numbers and corresponding indicia of times of calls to the terminating ANI are retrieved at an initiating event. (The initiating event may be the storage of data related to the current call placed to the terminating ANI, or the elapse of a period of time.) A determination is made of whether the number of billing numbers used for calls to the terminating ANI over a prior period of time falling within a time interval satisfies a threshold number. If the threshold number is satisfied, a fraud alert is generated.

After the initiating event, a check may also be performed (for example, in the memory) to determine if there is a threshold number and a time interval corresponding to the particular terminating ANI. If so, the threshold number and the time interval are retrieved and used in determining whether the number of billing numbers used for calls to the terminating ANI over a prior period of time falling within the retrieved time interval satisfies the retrieved threshold number.

Another embodiment of the present invention is a system for identifying fraud in a telecommunications system. The system comprises at least one processor, memory and related software. The at least one processor receives data related to a current call placed to a terminating ANI, where the received data includes at least the terminating ANI and a billing number. The processor retrieves from memory billing numbers for prior calls to the originating ANI, if any, and an indicia of the times of the calls. The processor also determines whether the number of billing numbers used for the current and prior calls to the terminating ANI over a prior period of time falling within a time interval satisfies a threshold number. If the threshold number is satisfied, a fraud alert is generated.

When the call is received, the processor may also determine whether a threshold number and a time interval corresponding to the particular terminating ANI are stored in the memory. If so, the threshold number and the time interval are retrieved and used in determining whether the number of billing numbers used for the current and prior calls to the terminating ANI over a prior period of time falling within the retrieved time interval satisfies the retrieved threshold number.

In the cases where a threshold number and a time interval corresponding to a particular terminating ANI are stored in the memory, the threshold and time interval for the terminating ANI may be a function of other variables, such as the billing product used for the call, the type of originating ANI, the time of day, day of the week, etc. If so, the appropriate threshold number and the time interval are retrieved and used in determining whether the number of billing numbers used for the current and prior calls to the terminating ANI over a prior period of time falling within the retrieved time interval satisfies the retrieved threshold number.

Techniques of determining whether the number of billing numbers used for calls to a terminating ANI over a prior period of time satisfies a threshold and generating a fraud alert if the threshold is satisfied will be referred to hereinbelow as fraud detection based on Call Attempt Velocity on a Terminating ANI or number ("CAVT").

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Figure 1:
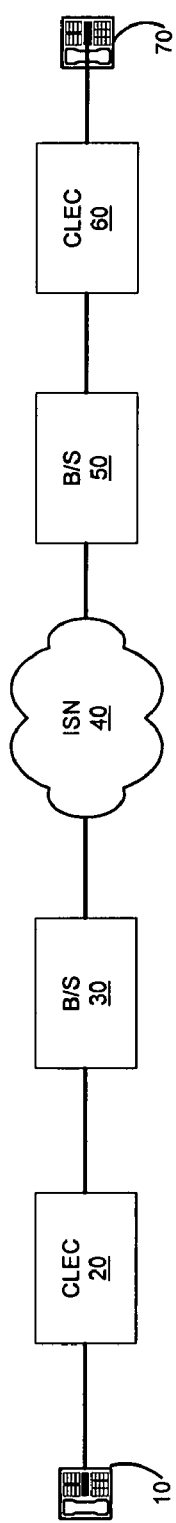
FIG. 1 is a block diagram of a telephone system that includes an intelligent services network (ISN)

Referring to FIG. 1, a representation of an underlying telephone system is shown which provides the context for the present invention. A call from an originating telephone 10 (also referred to as an originating automatic number indicator or originating ANI) is connected to an ISN 40 through a first competitive local exchange carrier 20 (CLEC) and a first bridge switch (B/S) 30. After processing, the ISN 40 routes the call to terminating telephone 70 (also referred to as an terminating automatic number indicator or terminating ANI) via a second B/S 50 and a second CLEC 60.

Figure 1A:
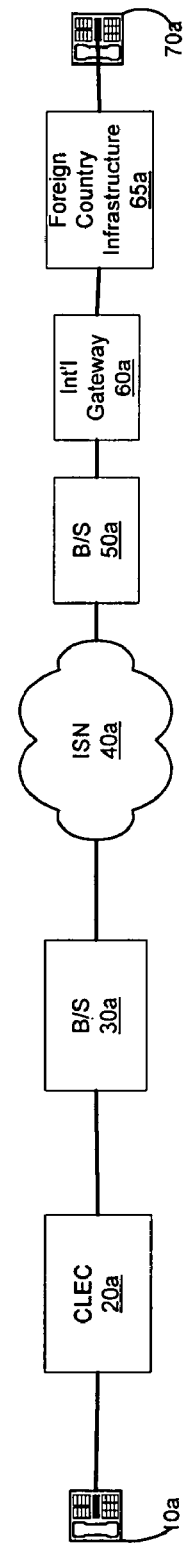
FIG. 1a is a block diagram of an alternative telephone system that includes an ISN.

Depending on where the call originates and terminates, additional or alternative infrastructure may support the connection between the originating ANI and the ISN and/or between the terminating ANI and the ISN. For example, as shown in FIG. 1a, if the call is made to a terminating ANI 70a in a foreign country, the call is routed from the ISN 40a to the terminating ANI 70a through B/S 50a, international gateway switching system 60a and the local switching infrastructure 65a of the foreign country. The foreign country infrastructure 65a can be comprised of a number of regional and local carriers.

An example of fraudulent calling for the system of FIG. 1 would be a hacker at the originating ANI 10 placing multiple calls to a PBX at the terminating ANI 70. The calls may be special service calls through the ISN 40 (discussed further below) using a multiplicity of different billing numbers. An example of fraudulent calling for the system of FIG. 1a would be a hacker at the originating ANI 10a placing multiple calls to one or more foreign terminating ANIs 70a. Again, the calls may be special services calls made through the ISN using a multiplicity of different billing numbers.

The supporting connections for a call that is placed using the ISN platform are billed to the company that owns and/or operates the ISN (referred to as the "telecommunications company"). Referring back to FIG. 1, the connection charges of CLEC 20, B/S 30, B/S 50 and CLEC 60 are the responsibility of the telecommunications company. Similarly, the telecommunications company is responsible for the connection charges shown in FIG. 1a, including the international gateway connection 60a and the connections 65a made in the foreign country by foreign carriers. Thus, the costs of the fraud to the telecommunications company given in the above examples may be significant. In addition, if the fraudulent caller is successful in hacking into a PBX, the PBX may be used to place subsequent fraudulent calls.

Figure 2:
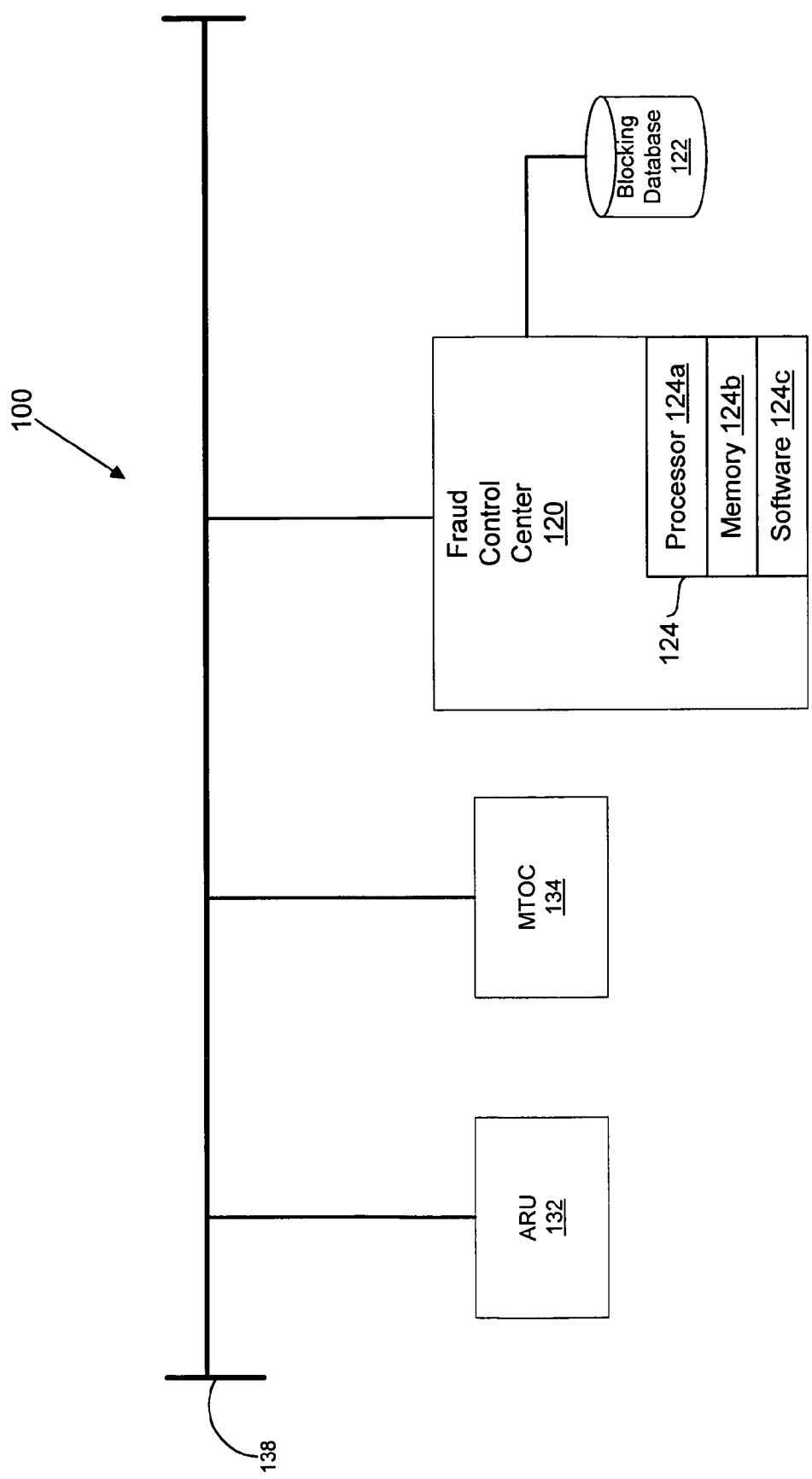
FIG. 2 is a block diagram of a preferred embodiment of the present invention as supported by the infrastructure of an ISN.

FIG. 2 represents components that support a preferred embodiment of a system of the present invention. The components 100 shown in FIG. 2 are part of a larger ISN platform, such as the ISN platforms 40, 40a represented in FIGS. 1 and 1a. The components 100 are comprised of a fraud control center 120 and associated blocking database 122, an automatic response unit (ARU) 132, and a manual telecommunications operator console (MTOC) 134 that preferably interface via an ethernet rail 138. A special service call is received by the ISN via the ARU 132 or the MTOC 134. Thus, for example, a call placed at originating ANI 10 of CLEC 20 shown in FIG. 1 is connected from the B/S 30 to the ISN 40 via the ARU 132 or the MTOC 134 shown in FIG. 2.

As previously noted, calls that require special services generally require the caller to manually supply a portable billing number (such as a credit card, calling card, pre-paid phone card, supplying a home phone number for a third party call, etc.), such as by pressing numbers on a payphone, swiping the magnetic strip of the card through a card reader, or speaking with an operator. Special services of an ISN are typically accessed by a toll free or special access number, such as, for example, MCI WorldCom's (800) 888-8000 access number. As described further below, a special services call received through the ARU 132 or the MTOC 134 will also include an identification code (information digit) from the CLEC 20 identifying the type of originating ANI 10. The terminating ANI, of course, is also supplied to the ISN in a special services call, since it is the number dialed by the caller.

Fraud control center 120 includes a system 124 that directly supports an embodiment of the present invention. In general, the system 124 comprises at least one processor (or computer) 124a, memory 124b and processing software 124c. The system may reside anywhere along ethernet rail 138 but is typically located in a fraud control facility, such as fraud control center 120.

System 124 generates fraud alerts based on suspect calling patterns to the same terminating ANI. Processor 124a receives data for special services calls received via the ARU 132 or MTOC 134. The data received includes the terminating ANI and the billing number. The processor 124a processes the calling data using the software 124c and, for each call, creates a calling record in the memory 124b. The calling record is referenced (or addressed) in the memory 124b by the terminating ANI and also includes the billing number and the time of the call.

When a call is placed from the originating ANI using the special services platform (i.e., is received via the ARU 132 or MTOC 134), data for the call is forwarded to the processor 124a via ethernet rail 138. The prior calling records created and stored in memory 124b for the terminating ANI are retrieved by the processor 124a and evaluated, along with the current call, using the software 124c. If the evaluation indicates that the pattern of calling from the originating ANI is consistent with fraudulent activity, an alert is generated.

For example, a fraudulent pattern of calling may be suggested by special services calls placed to a terminating ANI using ten or more distinct billing numbers within a one hour interval. If the data for the current and past calls to the terminating ANI shows that ten or more different billing numbers have been used for calls within an hour, an alert is generated for the terminating ANI. If not, then a calling record is created for the current call and stored in the memory 124b. (A calling record may be created for the current call even if an alert is generated.)

In the example described above, the threshold and time interval used to generate a fraud alert are fixed numbers, namely a threshold of ten different billing numbers for calls made to a terminating ANI within an hour. Use of established thresholds and time intervals as default parameters will in many cases prove to be useful in generating fraud alerts for many (or perhaps most) terminating ANIs. In general, little or nothing will be known about the particular terminating ANI being called and there would be no basis to alter the threshold or time interval based on the terminating ANI received.

However, there are many terminating ANIs which may normally receive ten or more calls placed using different billing numbers in the course of one hour. For example, a switchboard (or PBX) of a busy urban hospital, or the schedule and fare information number of a major carrier, may routinely get a surge of calls that exceeds these parameters. If default parameters are used in generating fraud alerts, these types of terminating ANIs may therefore create numerous fraud alerts which do not reflect fraudulent calling patterns. The calling data generating a fraud alert may subsequently be analyzed by a fraud analyst, who may investigate and determine that such a calling pattern does not reflect fraudulent calling to the particular terminating ANI. If the default parameters continue to be used for the terminating ANI, however, such fraud alerts will continue to be generated, thus needlessly burdening the fraud analyst or other portions of the system.

On the other hand, for certain terminating ANIs, the default threshold may be too high. For example, lengthy fraudulent calls are commonly made to terminating ANIs in foreign countries. Statistics available to or generated by the telecommunications company may show, for example, that special services calls to a terminating ANI in a particular city or other calling area of a certain foreign country is likely to be fraudulent. Calls to a particular city or region (whether foreign or domestic) may often be identified by an area code, city code, regional exchange, etc. of the terminating ANI. Where the fraud level is high, adjustment of the threshold and time interval for, calls to terminating ANIs in that calling region is warranted in order to generate an earlier fraud alert of possible fraudulent calling activity to the terminating ANI(s).

Thus, a database may be compiled based on experience with calls to terminating ANIs. The database may have particular thresholds and/or time intervals for particular terminating ANIs. Accordingly, memory 124b may also include a look-up table (or other data compilation that may be stored, retrieved and revised) where thresholds and time intervals are stored for terminating ANIs. For example, for the hospital PBX noted above, the telecommunications company may discover that it may be normal to have 15 special services calls within an hour placed to the terminating ANI from different originating ANIs using different billing numbers. For this terminating ANI, it is therefore desirable to have a fraud alert generated using a threshold of 20 different billing numbers over a one hour period. Thus, an entry is created in the look-up table that includes the terminating ANI, (for example, 516-555-1313), threshold of 20 and time interval of 1 hour. The entry is referenced (retrievable) in the database by the terminating ANI.

When a call is placed using the special services platform, in addition to retrieving the prior calling records created and stored in memory 124b for the terminating ANI, the processor 124a also uses the terminating ANI to check the look-up table to see if there is a threshold and time interval stored for that terminating ANI. If the terminating ANI is found, then the corresponding threshold number and time interval are retrieved and used to determine whether a fraud alert is generated for the current and prior calls to the terminating ANI.

For example, if the current call is to the terminating ANI 516-555-1313 given above, processor 124a will find an entry for the terminating ANI in the look-up table and retrieve the corresponding threshold 20 and time interval 1 hour from the look-up table. Processor 124a will also retrieve prior calling records created and stored in memory 124b for the terminating ANI and evaluate them and the current call using the retrieved threshold and time interval. If the data for the current and past calls to the terminating ANI shows that twenty or more different billing numbers have been used for calls within an hour, an alert is generated for the terminating ANI. If not, then a calling record is created for the current call and stored in the memory 124b. (A calling record may be created for the current call even if an alert is generated.)

In addition, it is possible to store more than one threshold number and time interval in memory 124b for a particular terminating ANI. Each threshold number and time interval stored for a particular terminating ANI may be correlated to other factors. Such factors may include the type of originating ANI the current call is made from, the type of billing product used for the current call, the time of day and/or the day of the week of the current call, etc.

For example, if the terminating ANI 516-555-1313 used in the example above is a PBX at a busy hospital, it may be found that the peak calling hours may be weekdays between 9:00 a.m. and 6:00 p.m. A threshold number of 20 and a time interval of 1 hour is desirable for this terminating ANI in this time-frame, as discussed above. Outside of that time frame, i.e., on weekends and weekdays from 6:01 p.m. to 8:59 a.m. when there are normally a smaller number of special services calls to the terminating ANI, a threshold number of 10 and a time interval of 1 hour is desirable. Thus, multiple entries are made in the look-up table in the memory for the terminating ANI 516-555-1313, and the entries are further referenced by day and time intervals. This allows processor 124a to use the time and day of the current call to look-up and retrieve a threshold number and time interval for the terminating ANI that is tailored to the time and day of the call.

The threshold and time interval may be adjusted to generate a fraud alert for lesser calling activity directed at a particular terminating ANI. For example, statistics may show that calls to a terminating ANI in a foreign country having country code 31 and city code 20 have a high percentage of fraud. Thus, for any terminating ANI having country code 31 and city code 20, it may therefore be desirable to have a fraud alert generated using a threshold of 2 different billing numbers over a one hour period. Thus, an entry is created in the look-up table for terminating ANI "011-31-20-*", where 011 identifies a foreign call, 31 is the country code, 20 is the city code and the asterisk matches any subsequent numbers in a terminating ANI. (Thus, the reduced threshold and time interval will be retrieved for any call to a terminating ANI in foreign city 20.) The threshold number 2 and time interval 1 hour is also stored in the entry.

If the current call is to a terminating ANI in the foreign city, for example, 011-31-20-5551212, processor 124a will check the look-up table to determine if it matches a terminating ANI stored therein. Processor 124a will match the terminating ANI 011-31-20-5551212 with the entry 011-31-20-* in the look-up table, since the asterisk denotes any sequence of subsequent numbers. Thus, processor 124a retrieves the corresponding threshold 2 and time interval 1 hour from the entry in the look-up table. Processor 124a will also retrieve prior calling records created and stored in memory 124b for the terminating ANI 011-31-20-5551212 and evaluate them, along with the current call, using the retrieved threshold number 2 and time interval 1 hour. If the data for the current and past calls to the terminating ANI shows that two or more different billing numbers have been used for calls within an hour, an alert is generated for the terminating ANI. If not, then a calling record is created for the current call and stored in the memory 124*b*. (A calling record may be created for the current call even if an alert is generated.)

As described above, more than one threshold number and time interval may be stored in memory 124*b* for a particular terminating ANI. Each threshold number and time interval stored for a particular terminating ANI may be correlated to other factors. For calls to a foreign terminating ANI, for example, such factors may include the type of originating ANI the current call is made from and the type of billing product used for the current call.

For example, for calls to foreign terminating ANIs 011-31-20-* used in the example above, the threshold number and time interval used to generate a fraud alert may differ depending on whether the call is made from an originating ANI that is a coin operated payphone or from a coinless payphone. Statistics may show that fraud is more prevalent to terminating ANIs in this foreign city for calls that originate from a coin operated payphone (which are typically located in highly accessible public places, such as train stations) than from a coinless payphone (which may be in a less prevalent public area, such as a hotel lobby). Thus, a threshold number of 2 different billing numbers in a one hour time interval may be appropriate for calls originating at a coin operated payphone, while a threshold number of 5 different billing numbers in a one hour interval may be appropriate for calls originating from a coinless payphone.

Thus, multiple entries are made in the look-up table in the memory for the terminating ANI 011-31-20-*, and the threshold number and time interval entries are further referenced by the type of originating ANI. (A call received by an ISN platform will include a "Bell Core information digit" which identifies the type of originating ANI from the CLEC. Thus, a call from an coin operated payphone will include information digit "27", while a call from a coinless payphone will include information digit "7".) This allows processor 124*a* to use the terminating ANI (such as terminating ANI 011-31-20-5551212) and the type of originating ANI (identified from the information digit) to look-up and retrieve the appropriate threshold number and time interval for the call. (A default threshold number and time interval may also be stored for calls to the terminating ANI that originate from other types of originating ANIs.)

Similarly, different thresholds and time intervals may be stored for a terminating ANI (or terminating ANIs), the various thresholds and time intervals referenced by the category or type of billing product used for the current call. Thus, calls to foreign terminating ANIs 011-31-20-* may be more likely to be fraudulent if placed with a credit card than with a calling card (both being categories of billing products), and separate thresholds and time intervals may thus be stored referenced by category of billing products. A particular type of calling card, such as an MCI VNET calling card, may have even less incidence of fraud, so another threshold and time interval may be stored for the terminating ANI referenced by the "calling card" category and "MCI VNET" type. A default threshold number and time interval may also be stored for special services calls to the terminating ANI for calls that use other categories and types of billing products.

Figure 3:
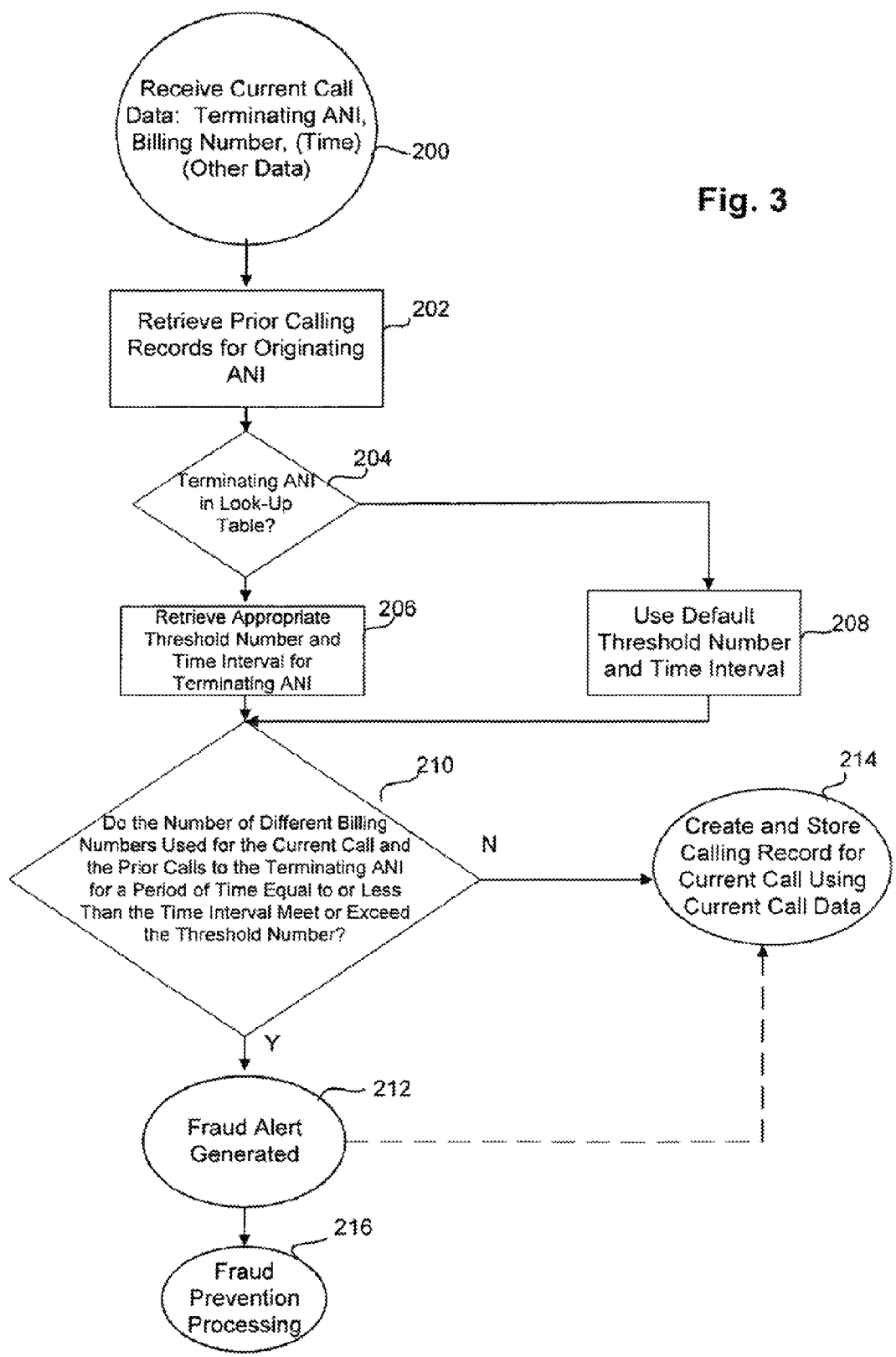
FIG. 3 is a flow chart of the processing of a preferred embodiment of the present invention.

FIG. 3 shows a flowchart of general procedures performed by the system 124 of FIG. 2 in carrying out embodiments of the invention exemplified above. In step 200, the processor 124*a* receives data for a special services call currently being routed to a terminating ANI. The data includes the terminating ANI and the billing number used for the call. The time of the call is also received or may alternatively be assigned as the time of receipt of data for the current call by the system 124. Additional data may also be received as discussed above, such as the information digit of the originating ANI, information related to the type and category of billing product, etc. At step 202, the processor 124*a* retrieves calling records (if any) for the terminating ANI from memory 124*b*. Each calling record for the terminating ANI includes at least the time of a prior call (or, equivalently, elapsed time since the call) and the billing number used for the prior call.

The processor 124*a* checks a look-up table for the terminating ANI at step 204 and, if the terminating ANI is found, retrieves an appropriate threshold number and a time interval at step 206. The threshold number and time interval retrieved may be chosen from a number of threshold numbers and time intervals stored for the terminating ANI which are correlated to other factors. For example, the threshold number and time interval selected for the terminating ANI may depend on the type of the originating ANI, or the type and/or category of billing product. If so, processor 124*a* uses additional data received in step 200 for the current call, namely, the information digit or the category and/or type of billing product, to choose the applicable threshold number and time interval for the terminating ANI. If, however, the threshold number and time interval selected for the terminating ANI depends on the time of day and/or the day of week, then processor 124*a* may make the selection based on its internal clock and calendar.

If the terminating ANI is not found in the look-up table, a default threshold number and time interval are used, as shown in step 208. The threshold number and time interval selected in either step 206 or 208 represents the threshold number of different billing numbers used for calls to the terminating ANI over the time interval.

The billing number for the current call and the billing numbers for prior calls, and the times of those calls are evaluated at step 210 to determine if the threshold number has been met or exceeded over the time interval. Thus, the number of different billing numbers used for the current and prior calls to the terminating ANI are counted for a prior period of time equal to or less than the time interval. If the number of different billing numbers meets or exceeds the threshold, a fraud alert is generated at step 212. A fraud alert initiates fraud prevention processing (step 216), described further below.

If the number of different billing numbers does not meet or exceed the threshold, then a call record for the current call is created (step 214), which includes the terminating ANI, the billing number and the time of the call. A call record may also be created for the current call even if a fraud alert is generated in step 212, as indicated by the dashed line from step 212 to step 214.

It is noted that other sequences of steps may be used in FIG. 3. For example, step 202 may be performed after steps 206 and 208. In addition, a calling record for the current call may be created and stored (shown in step 214) any time after the data is received in step 200.

As noted, if a fraud alert is generated in step 212, fraud prevention processing is initiated in step 216. The processing related to fraud prevention may include sending the calling data for the terminating ANI to a fraud analyst for further consideration. The fraud analyst may determine whether to block or intercept future calls to the terminating ANI. Alternatively, further special services calls to the terminating ANI may be immediately blocked. Blocking calls to the terminating ANI may be accomplished by storing the terminating ANI in a blocking database, such as blocking database 122 shown in FIG. 2. Before a subsequent special service call received via the ARU 132 or MTOC 134 is connected, the blocking database 122 is checked to see whether the terminating ANI for the call is included therein. (Blocking database 122 is depicted in FIG. 2 as interfacing with fraud control center 120 because it may be located in the same physical facility as fraud control center 120. However, the ARU 132 and the MTOC 134 may access the blocking database 122 as if it were connected directly to the ethernet rail 138.) If the terminating ANI is found in the blocking database 122, the call is not connected.

In addition, the billing numbers used to make the current and prior calls to the terminating ANI may also be blocked either immediately or after further consideration by a fraud analyst. This may also be accomplished by storing the billing numbers in the blocking database 122 or a similarly configured database. The billing numbers may be categorized in the database according to category and/or type of billing product. Before a subsequent special services call received via the ARU 132 or MTOC 134 is connected, the blocking database is checked to determine whether the billing number being used for the call is included therein. The check of the database may also use the category and type of the billing product to look up the billing number. If the billing number is found in the database, the call is not connected.

Referring back to FIG. 3, it was noted that, even if a fraud alert is generated in step 212, a calling record may be created and stored for the current call. Such a calling record may be created even where a fraud alert is generated because, for example, a fraud analyst may elect not to block the terminating ANI based on the present calling pattern. Thus, the calling record for the current call may be used to evaluate future calls to the terminating ANI for potentially fraudulent calling patterns.

The processing of the present invention need not necessarily be made at the time a call is received from an originating ANI to a terminating ANI. Calling records for calls may be accumulated and then processed. The processing may occur periodically, such as every ten minutes. The processing of accumulated calling records includes separating or selecting calling records for each terminating ANI. From each group of records corresponding to a terminating ANI, the number of different billing numbers used for calls over a time interval are then evaluated against the threshold number and time interval for the terminating ANI (as found in a look-up table, or by using defaults). Fraud alerts are then generated for each terminating ANI showing calls made with a number of different billing numbers that met or exceeded the threshold over a period of time equal to or less than the time interval.

For processing that was not initiated by a current call, but instead occurred periodically, the look-up table may not include different threshold numbers and time intervals for the terminating ANI that are a function of certain data related to a current call, such as type of billing product or type of originating ANI. If it does, the processor 124*a* may consider the last call made to the terminating ANI to be the "current call".

As noted, processing would occur periodically and such periods would be relatively short. Periods of ten minutes may be acceptable and, generally, the periods would not exceed one or two hours. Such short periods provide the up-front processing needed to identify fraudulent patterns close to the time they are initiated and to avoid long periods of fraudulent calling without identification and prevention.

In those portions of the Detailed Description where it was elaborated, a threshold was referred to as being "met or exceeded" by the number of different billing numbers. As noted in the "Summary" section, a threshold may alternatively be defined as satisfied if it is "exceeded". Thus, in all of the above embodiments, the determination may alternatively be whether the threshold is exceeded by the number of different billing numbers. In addition, where specified, the data for current and prior calls was considered for a period of time "less than or equal to" the time interval. As also noted in the Summary section, a period of time may be alternatively defined as falling within a time interval if it is less than the time interval. Thus, in all of the above embodiments, the current and prior calls that are used in the determination may alternatively be for a period of time that is less than (but not equal to) the time interval.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

The invention claimed is:

1. A method of identifying fraud in a telecommunications system, the method comprising the steps of:

receiving data related to current call placed to a terminating ANI, the received data including the terminating ANI and a billing number;

storing the received data and an indicia of the time of the call;

at an initiating event, retrieving the billing numbers and corresponding indicia of times of calls to the terminating ANI;

determining, by a processor, whether the number of billing numbers used for calls to the terminating ANI over a prior period of time falling within a time interval satisfies a threshold; and generating a fraud alert if the threshold is satisfied.

2. The method as in claim 1, wherein the initiating event is the receipt of data related to the current call placed to the terminating ANI.

3. The method as in claim 1, wherein the initiating event is the elapse of a period of time.

4. The method as in claim 1, wherein the billing numbers and corresponding indicia of times of calls to the terminating ANI are retrieved from stored calling records, each calling record containing data for one prior call to the terminating ANI, the calling record being referenced by the terminating ANI and including the billing number used for the call and an indicia of the time of the call.

5. The method as in claim 1, further comprising the step of:

Creating a calling record for the current call and storing the calling record in a memory, the calling record including the terminating ANI, the billing number and an indicia of the time of the call, the calling record being referenced in the memory by the terminating ANI.

6. The method as in claim 1, wherein the time interval and threshold for the terminating ANI are selected among two or more threshold numbers and time intervals for the terminating ANI.

7. The method as in claim 6, wherein one of the two or more threshold numbers and time intervals for the terminating ANI are selected based upon one or more additional factors.

8. The method as in claim 1, wherein the step of determining whether the number of billing numbers used for calls to the terminating ANI over a prior period of time falling within a time interval satisfies a threshold comprises counting a number of different billing numbers for the current call and prior calls to the terminating ANI spanning from a time of the current call backwards in time over a period equal to the time interval, and comparing the number of different billing numbers with the threshold.

9. The method as in claim 1, further comprising the step of:
blocking subsequent calls to the terminating ANI.

10. The method as in claim 1, further comprising the step of:
blocking subsequent calls that use billing numbers used for the current and prior calls to the terminating ANI.

11. An apparatus for identifying fraud in a telecommunications system, the apparatus comprising:
at least one processor; and
at least one memory including computer program code,
the at least one memory and the computer program code configured to, with the at least one processor, cause the apparatus to perform at least the following,
receive data related to current call placed to a terminating ANI, the received data including the terminating ANI and a billing number,
store the received data and an indicia of the time of the call,
at an initiating event, retrieve the billing numbers and corresponding indicia of times of calls to the terminating ANI,
determine whether the number of billing numbers used for calls to the terminating ANI over a prior period of time falling within a time interval satisfies a threshold, and
generate a fraud alert if the threshold is satisfied.

12. The apparatus of claim 11, wherein the initiating event is the receipt of data related to the current call placed to the terminating ANI.

13. The apparatus of claim 11, wherein the initiating event is the elapse of a period of time.

14. The apparatus of claim 11, wherein the billing numbers and corresponding indicia of times of calls to the terminating ANI are retrieved from stored calling records, each calling record containing data for one prior call to the terminating ANI, the calling record being referenced by the terminating ANI and including the billing number used for the call and an indicia of the time of the call.

15. The apparatus of claim 11, wherein the apparatus is further caused to perform at least the following:
create a calling record for the current call and store the calling record in a memory, the calling record including the terminating ANI, the billing number and an indicia of the time of the call, the calling record being referenced in the memory by the terminating ANI.

16. The apparatus of claim 11, wherein the time interval and threshold for the terminating ANI are selected among two or more threshold numbers and time intervals for the terminating ANI.

17. The apparatus of claim 16, wherein one of the two or more threshold numbers and time intervals for the terminating ANI are selected based upon one or more additional factors.

18. The apparatus of claim 11, wherein the step of determining whether the number of billing numbers used for calls to the terminating ANI over a prior period of time falling within a time interval satisfies a threshold comprises counting a number of different billing numbers for the current call and prior calls to the terminating ANI spanning from a time of the current call backwards in time over a period equal to the time interval, and comparing the number of different billing numbers with the threshold.

19. The apparatus of claim 11, wherein the apparatus is further caused to perform at least the following:
blocking subsequent calls to the terminating ANI.

20. The apparatus of claim 11, wherein the apparatus is further caused to perform at least the following:
blocking subsequent calls that use the billing numbers used for the current and prior calls to the terminating ANI.

* * * * *